United States Patent
Taguchi et al.

(10) Patent No.: US 8,927,174 B2
(45) Date of Patent: Jan. 6, 2015

(54) SEALING STRUCTURE OF FUEL CELL

(75) Inventors: Shinichiro Taguchi, Fujisawa (JP);
Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 510 days.

(21) Appl. No.: 13/320,886

(22) PCT Filed: Apr. 27, 2010

(86) PCT No.: PCT/JP2010/057402
§ 371 (c)(1),
(2), (4) Date: Nov. 16, 2011

(87) PCT Pub. No.: WO2010/134421
PCT Pub. Date: Nov. 25, 2010

(65) Prior Publication Data
US 2012/0064429 A1  Mar. 15, 2012

(30) Foreign Application Priority Data

May 19, 2009  (JP) .................................. 2009-120694
Feb. 15, 2010  (JP) .................................. 2010-029816

(51) Int. Cl.
*H01M 2/08* (2006.01)
*H01M 8/02* (2006.01)
*H01M 8/10* (2006.01)

(52) U.S. Cl.
CPC .......... *H01M 8/0276* (2013.01); *H01M 8/0247* (2013.01); *H01M 2008/1095* (2013.01); *Y02E 60/50* (2013.01)
USPC ........... 429/511; 429/467; 429/468; 429/507; 429/508; 429/509; 429/510

(58) Field of Classification Search
None
See application file for complete search history.

(56) References Cited

U.S. PATENT DOCUMENTS

2002/0055027 A1  5/2002  Inoue et al.
2005/0249997 A1  11/2005  Tomimatsu et al.

FOREIGN PATENT DOCUMENTS

| JP | 2002-042837 A | 2/2002 |
| JP | 2005-158424 A | 6/2005 |
| JP | 2005-197086 A | 7/2005 |
| JP | 2005-276820 A | 10/2005 |
| JP | 2008-097899 A | 4/2008 |
| JP | 2009-037960 A | 2/2009 |

OTHER PUBLICATIONS

Naohiro (JP, 2009-037960) (a raw machine translation) (Abstract, Detailed Description & Drawings) (Feb. 19, 2009).*

* cited by examiner

*Primary Examiner* — Milton I Cano
*Assistant Examiner* — Carmen Lyles-Irving
(74) *Attorney, Agent, or Firm* — Harness, Dickey & Pierce, P.L.C.

(57) ABSTRACT

A sealing structure of a fuel cell has a first gasket made of an elastomer and provided integrally on a separator, and a second gasket made of an elastomer and provided integrally on other separator. A membrane-electrode assembly is sandwiched or pinched by the first and second gaskets. The first gasket has a main lip in which a top portion brought into close contact with the membrane-electrode assembly is formed flat. The second gasket has a flat seal portion and a sub lip protruding from this flat seal portion at a position opposing the main lip. The flat seal portion and the sub lip are brought into close contact with the membrane-electrode assembly. The width of the top portion of the main lip is narrower than the width of the flat seal portion, and larger than the width of the sub lip.

2 Claims, 7 Drawing Sheets

SEALING STRUCTURE OF FUEL CELL

CROSS-REFERENCE TO RELATED APPLICATIONS

This application is a U.S. National Stage Application of International Application No. PCT/JP2010/057402, filed Apr. 27, 2010 and published in Japanese as WO/2010/134421 on Nov. 25, 2010. This application claims the benefit of Japanese Application No. 2009-120694, filed May 19, 2009 and Japanese Application No. 2010-029816, filed Feb. 15, 2010. The entire disclosures of the above applications are incorporated herein by reference.

BACKGROUND OF THE INVENTION

1. Field of the Invention

The present invention relates to a sealing structure pinching a membrane-electrode assembly by gaskets which are integrally provided in separators which are arranged in both sides in a thickness direction of the same, in a fuel cell.

2. Description of the Conventional Art

The fuel cell has a structure obtained by alternately arranging a membrane-electrode assembly (MEA) provided with a pair of catalyst electrode layers on both surfaces of a high polymer electrolyte membrane and porous gas diffusion layers (GDL) laminated in both sides in a thickness direction thereof, and a separator made of a carbon or a metal so as to laminate, circulates a fuel gas and an oxidation gas to both surfaces of the membrane-electrode assembly, and generates an electric power on the basis of an electrochemical reaction corresponding to a reverse reaction to an electrolytic process of a water, that is, a reaction creating a water from a hydrogen and an oxygen.

In this kind of fuel cell, there is provided with a sealing structure for sealing the fuel gas and the oxidation gas, the water created by the reaction and the surplus oxidation gas, a cooling medium and the like. FIG. 8 is a partial cross sectional view which shows a sealing structure of a fuel cell in accordance with a prior art in a separated state. In this FIG. 8, reference numeral 110 denotes a membrane-electrode assembly which is constructed by a high polymer electrolyte membrane, and catalyst electrode layers provided in both sides thereof and the like, and separators 120 are laminated in both sides in a thickness direction of the membrane-electrode assembly 110.

A gasket 130 integrally provided in the separators 120 in both sides in the thickness direction thereof is brought into close contact with a peripheral edge of the membrane-electrode assembly 110. The gasket 130 is made of a rubber-like elastic material (a rubber or a synthetic resin material having a rubber-like elasticity), and a seal protrusion 131 is formed for obtaining a desired surface pressure.

In this case, since the membrane-electrode assembly 110 is thin and soft, there is such a problem that a sealing performance becomes unstable due to a displacement of a surface pressure maximum portion by the seal protrusion 131, if any slight offset (displacement) δ is generated by an assembling precision. Further, even if the desired sealing performance can be secured, a reaction force of the gasket 130 greatly fluctuates on the basis of the offset δ, there is a risk that a power generating performance becomes unstable due to an influence of a power generation region (not shown) to a lamination pressure.

Then, as a sealing structure of a fuel cell in accordance with the other prior art is shown in FIG. 9 in a separated state, as a method of preventing the problem due to the offset as mentioned above, there has been known a matter that a peripheral edge of the membrane-electrode assembly 110 is pinched by the gasket 130 having the seal protrusion 131, and a gasket 140 in which a flat seal portion 141 is formed as shown in Japanese Unexamined Patent Publication No. 2008-97899.

In this case, a desired surface pressure can be secured in a seal surface by the seal protrusion 131 of the gasket 130, however, since the surface pressure is dispersed in a seal surface by the flat seal portion 141 of the gasket 140, and the surface pressure is lowered in comparison with the seal protrusion 131 side, there is such a problem that a desired seal property can not be obtained. Accordingly, in order to compensate for the reduction of the seal property mentioned above, as a sealing structure of a fuel cell in accordance with further the other prior art is shown in FIG. 10 in a separated state, there can be thought such a structure that a gasket 150 having a seal protrusion 151 and a flat seal portion 152 is provided in the separators 120 in both sides so as to form a swirl shape with each other, and the pinching of the membrane-electrode assembly 110 by the seal protrusion 151 and the flat seal portion 152 is carried out by two positions in a width direction, however, there is such a problem that a width of the gasket 150 becomes large in this case.

SUMMARY OF THE INVENTION

The present invention is made by taking the points mentioned above into consideration, and a technical object thereof is to stabilize a power generating performance of a power generating region as well as securing a stable sealing performance even if an offset due to an assembling precision exists in gaskets in both sides of a membrane-electrode assembly, in a sealing structure of a fuel cell.

Means for Solving the Problem

As a means for effectively achieving the technical object mentioned above, a sealing structure of a fuel cell in accordance with the invention of the first aspect is a sealing structure pinching a membrane-electrode assembly by a first gasket which is integrally provided in a separator arranged in one side in a thickness direction of the membrane-electrode assembly and is made of a rubber-like elastic material, and a second gasket which is integrally provided in a separator arranged in another side in the thickness direction and is made of a rubber-like elastic material, wherein the first gasket has a bank-like main lip which is brought into close contact with the membrane-electrode assembly in its top portion, the second gasket has a flat seal portion which is brought into close contact with the membrane-electrode assembly, and a sub lip which is formed in a bulging manner at an opposed position to the main lip in the flat seal portion, a width of the top portion of the main lip is wider than an assumed maximum offset amount and narrower than a width of the flat seal portion, and the sub lip is narrower in its width than the top portion of the main lip.

On the basis of the sealing structure of the fuel cell in accordance with the present invention, since the membrane-electrode assembly is pinched between the top portion of the main lip of the first gasket, and the flat seal portion and the sub lip of the second gasket, a contact surface pressure of the flat seal portion of the second gasket with respect to the membrane-electrode assembly is compensated by the sub lip. Further, since the width of the top portion of the main lip in the first gasket is narrower than the width of the flat seal portion of the second gasket, a desired contact surface pressure is secured with respect to the membrane-electrode assembly.

Further, since the width of the top portion of the main lip is wider than the assumed maximum offset amount, it is possible to pinch the membrane-electrode assembly by the top portion of the main lip of the first gasket and the flat seal portion and the sub lip of the second gasket, even if any offset is generated on the basis of an assembly precision. Here, one skilled in the art will appreciate that the assumed maximum offset amount corresponds to the largest amount of offset that could be expected to occur due to the precision tolerances available in the assembly process. In other words, it is the maximum amount of tolerated offset.

Further, a sealing structure of a fuel cell in accordance with the invention of the second aspect is structured such that second sub lips are respectively provided in both ends in a width direction of the top portion of the main lip, in the structure described in the first aspect.

In accordance with the structure of the second aspect, even if the sub lip of the second gasket is opposed to the end portion in the width direction in the top portion of the main lip of the first gasket in accordance with an enlargement of the offset, the membrane-electrode assembly is pinched by the sub lip, and the second sub lip formed on the end portion in the width direction of the top portion of the main lip. Accordingly, a sufficient contact surface pressure can be secured.

Effect of the Invention

On the basis of the sealing structure of the fuel cell in accordance with the present invention, since the pinching of the membrane-electrode assembly is carried out between the main lip of the first gasket, and the flat seal portion and the sub lip of the second gasket, a desired contact surface pressure can be secured, thus it is not necessary to enlarge the width of the gasket accordingly. Further, even if the offset is generated by the assembly precision, a stable sealing performance can be obtained, therefore, it is possible to stabilize a power generating performance of a power generating region.

DETAILED DESCRIPTION OF PREFERRED EMBODIMENTS

Figure 1:
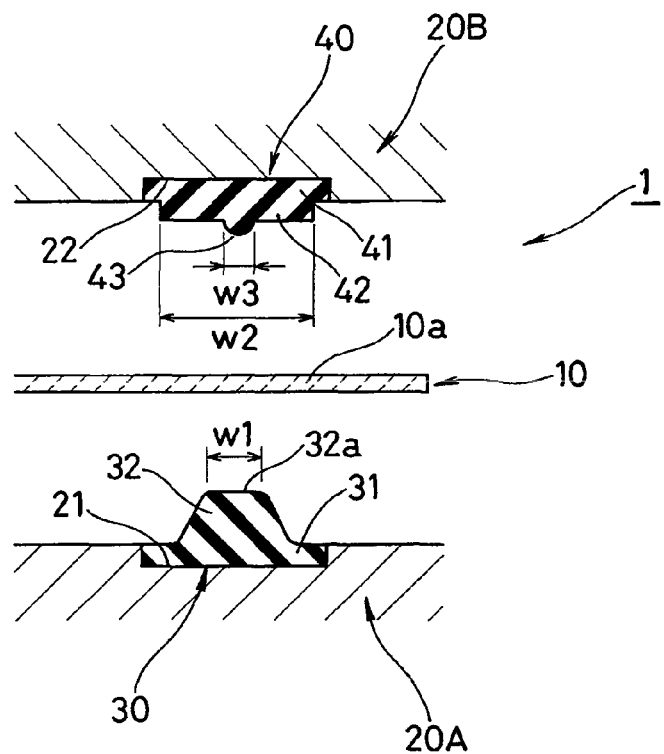
FIG. 1 is a partly cross sectional view showing a sealing structure of a fuel cell in accordance with a preferable first embodiment of the present invention in a separated state.

A description will be given below of a sealing structure of a fuel cell in accordance with the present invention with reference to the accompanying drawings. FIG. 1 is a partly cross sectional view showing a sealing structure of a fuel cell in accordance with a preferable first embodiment of the present invention in a separated state.

In FIG. 1, reference numeral 10 denotes a membrane-electrode assembly which is provided with a high polymer electrolyte membrane and catalyst electrode layers arranged in a laminated state in both sides thereof. Separators 20A and 20B are respectively superposed on both sides of the membrane-electrode assembly 10, whereby a fuel cell 1 is constructed.

A peripheral edge portion 10a of the membrane-electrode assembly 10 is structured such as to be sealed so that a fuel gas (a hydrogen) and an oxidation gas, a water created by an electrochemical reaction so as to be discharged and a surplus oxidation gas, and a cooling medium and the like do not leak from their respective flow paths, by being pinched between a first gasket 30 which is integrally provided in one separator 20A and is made of a rubber-like elastic material (a rubber or a synthetic resin material having a rubber-like elasticity), and a second gasket 40 made of the rubber-like elastic material is integrally provided in another separator 20B.

The first gasket 30 is constructed by a base portion 31 being integrally bonded within a groove 21 formed in one separator 20A, and a bank-like main lip 32 being bulged from the base portion 31 where a top portion 32a of the main lip 32 brought into close contact with the membrane-electrode assembly 10 is formed flat. On the other hand, the second gasket 40 is structured such as to have a base portion 41 being integrally bonded within a groove 22 formed in the another separator 20B, a flat seal portion 42 being bulged from the base portion 41, and a sub lip 43 being formed in a bulging manner in the flat seal portion 42.

The top portion 32a of the main lip 32 in the first gasket 30 is brought into close contact with the membrane-electrode assembly 10, and a width w1 thereof is made wider than an assumed maximum offset amount, and narrower than a width w2 of the flat seal portion 42 in the second gasket 40. Further, the sub lip 43 formed in the flat seal portion 42 is formed at an opposed position to the top portion 32a of the main lip 32 in a portion which locally enhances a contact surface pressure with the membrane-electrode assembly 10, and a width w3 thereof is narrower than the width w1 of the top portion 32a of the main lip 32.

In the structure mentioned above, in a state in which a lot of fuel cells 1 are laminated, and are fastened by bolts and nuts (not shown) so as to be assembled as a fuel cell stack, the peripheral edge portion 10a of the membrane-electrode assembly 10 is pinched between the main lip 32 of the first gasket 30 and the flat seal portion 42 of the second gasket 40.

Further, in the main lip 32 of the first gasket 30, since the width w1 of the top portion 32a which is brought into close contact with the membrane-electrode assembly 10 is sufficiently narrower than the width w2 of the flat seal portion 42 of the second gasket 40, a sufficient contact surface pressure can be secured with respect to the membrane-electrode assembly 10. On the other hand, a contact surface pressure of the flat seal portion 42 of the second gasket 40 with respect to the membrane-electrode assembly 10 becomes locally larger by the sub lip 43. Therefore, it is possible to achieve a good sealing performance by the first gasket 30 and the second gasket 40.

Figure 2:
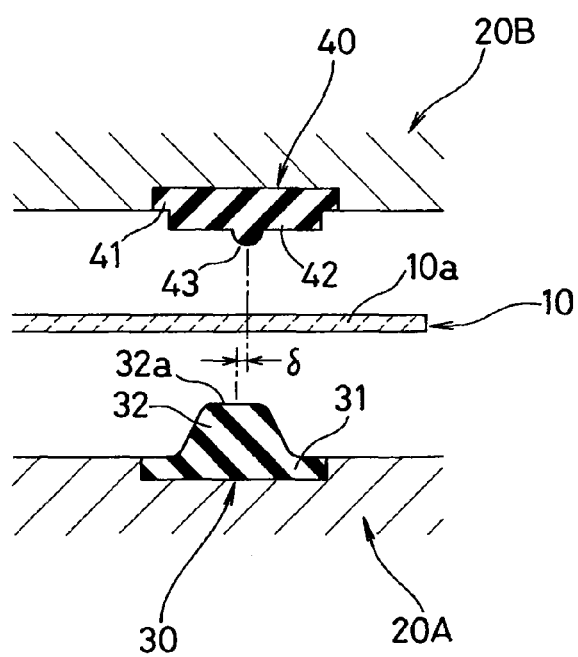
FIG. 2 is a partly cross sectional view showing a state in which an offset is generated, in a separated state, in the first embodiment.

In this case, as shown in FIG. 2, even if a slight offset δ (which is indicated as a displacement between a center in a width direction of the top portion 32a of the main lip 32 and a center in a width direction of the sub lip 43 of the flat seal portion 42) exists on the basis of an assembly precision in the separator 20A and the separator 20B, in other words, the first gasket 30 and the second gasket 40, a close contact region of the top portion 32a of the main lip 32 with respect to the membrane-electrode assembly 10 is opposed to the flat seal portion 42 which is wider than it, and the sub lip 43 formed in a bulging manner in the flat seal portion 42 is opposed to the top portion 32a of the main lip 32. This is because the width w1 of the top portion 32a of the main lip 32 becomes wider than the assumed maximum offset amount.

Accordingly, since the membrane-electrode assembly 10 comes to a state of being pinched by the top portion 32a of the main lip 32 of the first gasket 30 and the flat seal portion 42 and the sub lip 43 of the second gasket 40 even if the offset δ exists, it is possible to obtain a stable contact surface pressure of the first gasket 30 and the second gasket 40 with respect to the membrane-electrode assembly 10. As a result, a stable sealing performance can be secure, any great bending moment does not act on the membrane-electrode assembly 10, and reaction forces of the gaskets 30 and 40 do not fluctuate greatly due to the offset δ. Accordingly, an influence to a lamination pressure of a power generation region (not shown) existing in a left side in FIG. 1 and FIG. 2 is small. As a result, a stable power generating performance can be secured.

Figure 3:
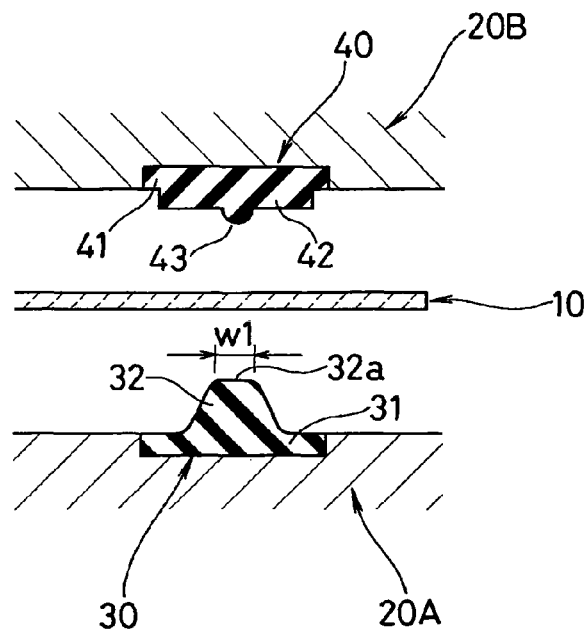
FIG. 3 is a partly cross sectional view showing an example in which a width of a top portion of a main lip is made smaller than the example shown in FIG. 1, in a separated state, in the first embodiment.

In the case that a maximum offset amount on the basis of the assumed assembly precision is small, it is possible to make the width w1 of the top portion 32a of the main lip 32 in the first gasket 30 narrower as shown in FIG. 3, accordingly. Thus, it is possible to enhance the contact surface pressure of the main lip 32 with respect to the membrane-electrode assembly 10.

Figure 4:
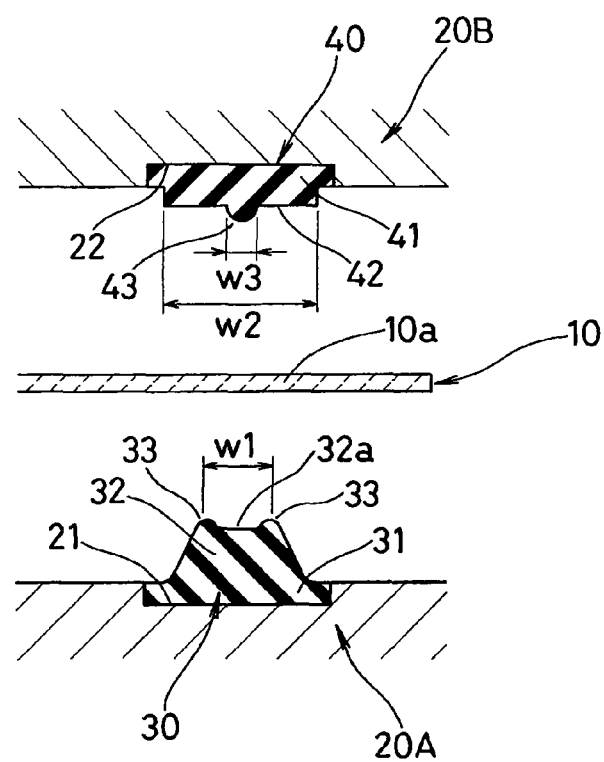
FIG. 4 is a partly cross sectional view showing a sealing structure of a fuel cell in accordance with a preferable second embodiment of the present invention in a separated state.

Next, FIG. 4 is a partly cross sectional view showing a sealing structure of a fuel cell in accordance with a preferable second embodiment of the present invention in a separated state.

In this second embodiment, a difference from the first embodiment mentioned above exists in a point that a second sub lip 33 is provided in each of both ends in a width direction of the top portion 32a of the main lip 32 in the first gasket 30.

In accordance with the structure mentioned above, since a locally maximum portion of the contact surface pressure with respect to the membrane-electrode assembly 10 is formed at a plurality of positions by the sub lip 43 and the second sub lips 33 and 33, a further good sealing performance can be achieved.

Further, since the membrane-electrode assembly 10 is pinched by the sub lip 43 and the second sub lip 33, even if the sub lip 43 of the second gasket 40 deviates to the opposed position to the end portion in the width direction in the top portion 32a of the main lip 32 of the first gasket 30 due to the enlargement of the offset on the basis of the assembly precision, a sufficient contact surface pressure can be secured.

Figure 5:
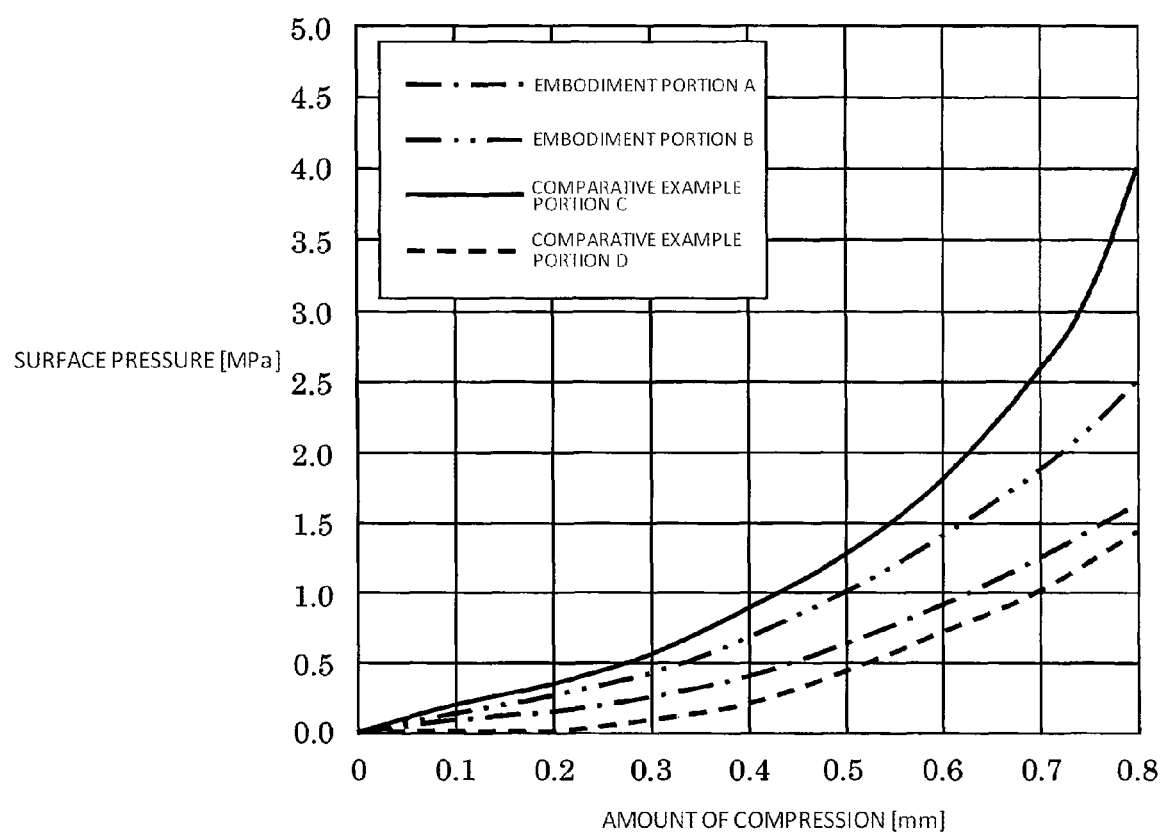
FIG. 5 is a graph showing a result obtained by measuring a contact surface pressure of a gasket with respect to a membrane-electrode assembly.
Figure 6:
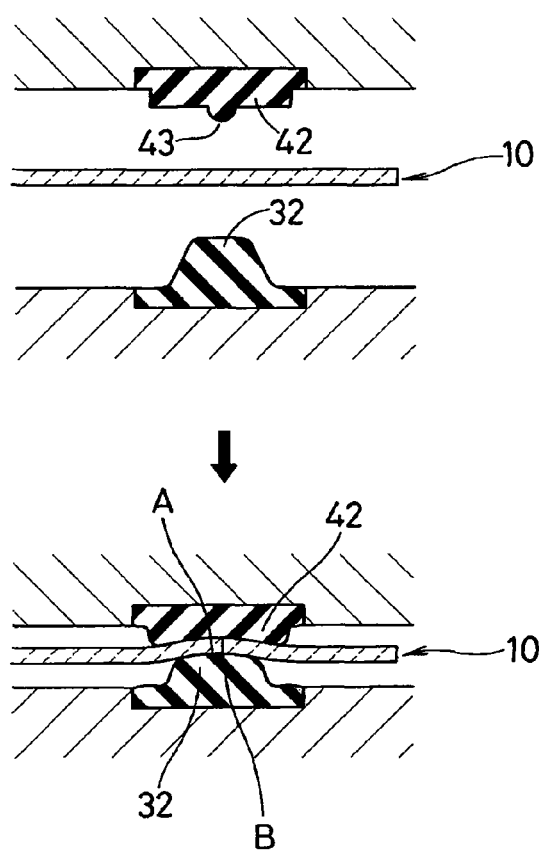
FIG. 6 is a view for explaining a measured position of the contact surface pressure of the gasket in accordance with an embodiment in the graph of FIG. 5.
Figure 7:
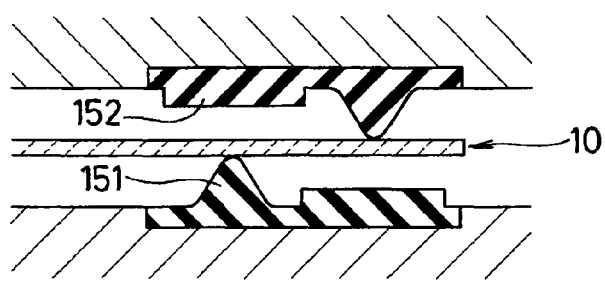
FIG. 7 is a view for explaining a measured position of the contact surface pressure of the gasket in accordance with a comparative example in the graph of FIG. 5.
Figure 7:
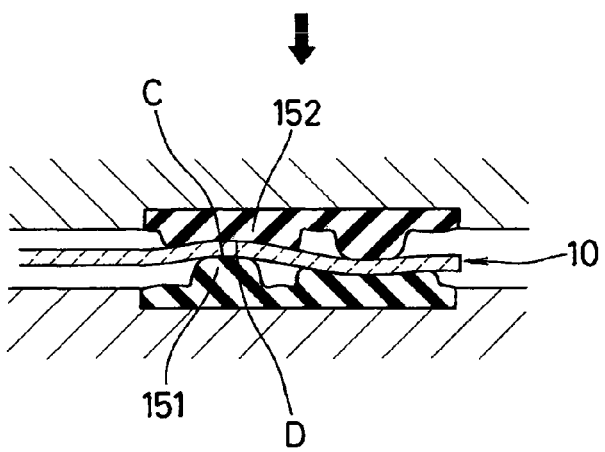
Figure 8:
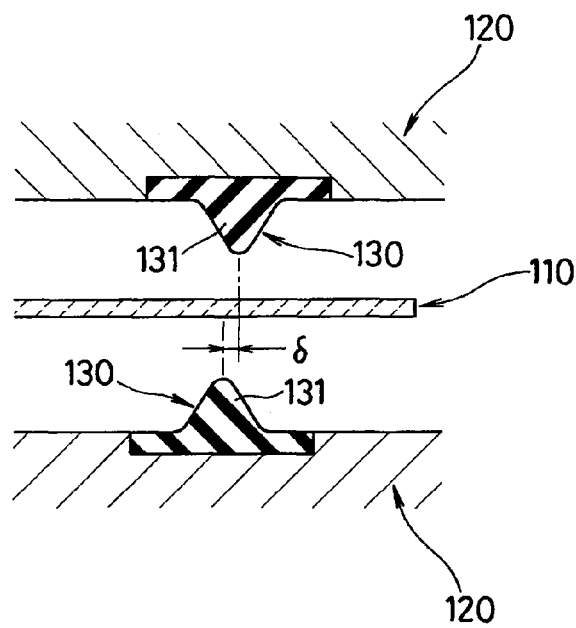
FIG. 8 is a partly cross sectional view showing a sealing structure of a fuel cell in accordance with a prior art, in a separated state.
Figure 9:
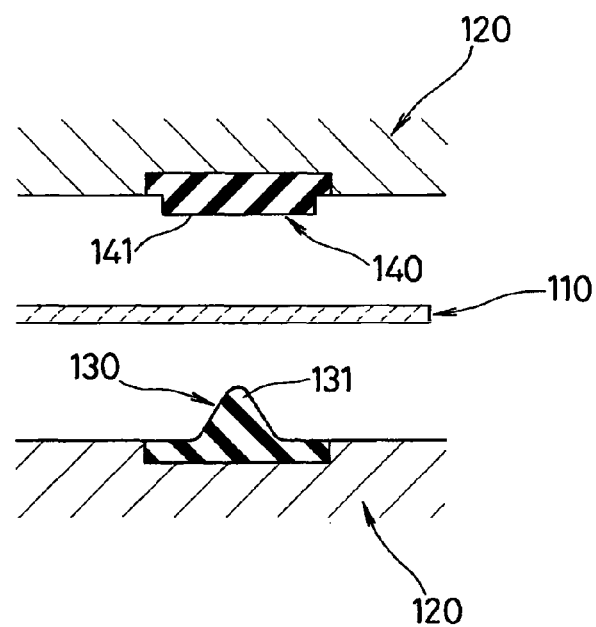
FIG. 9 is a partly cross sectional view showing a sealing structure of a fuel cell in accordance with the other prior art, in a separated state.
Figure 10:
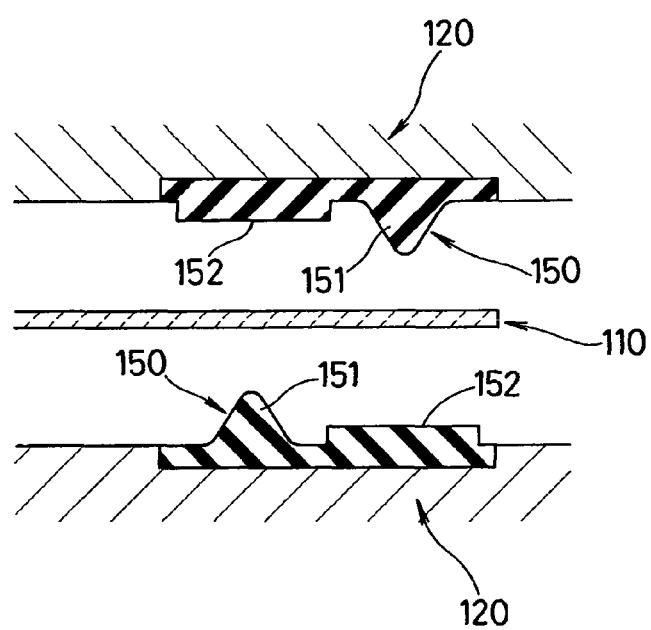
FIG. 10 is a partly cross sectional view showing a sealing structure of a fuel cell in accordance with the other prior art, in a separated state.

FIG. 5 is a graph showing a result obtained by measuring the contact surface pressure of the gasket with respect to the membrane-electrode assembly, by comparing an embodiment and a comparative example. Among them, the embodiment employs the same structure in FIG. 1 which is described previously as the first embodiment, as shown in FIG. 6, and there are measured a contact surface pressure A between the membrane-electrode assembly 10 and the main lip 32 of the first gasket 30 in the portion opposed to the sub lip 43, and a contact surface pressure B between the membrane-electrode assembly 10 and the sub lip 43. Further, the comparative example employs the same structure in FIG. 10 which is described previously as the prior art, as shown in FIG. 7, and there are measured a contact surface pressure C between the membrane-electrode assembly 10 and the top portion of the seal protrusion 151, and a contact surface pressure D between the membrane-electrode assembly 10 and the flat seal portion 152 in the portion opposed to the top portion of the seal protrusion 151.

On the basis of the results of measurement, it was confirmed that a difference between the contact surface pressure of the portion C by the seal protrusion 151 and the contact surface pressure of the portion D by the flat seal portion 152 is great, in the comparative example, and on the contrary, in the embodiment in accordance with the present invention, a difference between the contact surface pressure of the portion A by the main lip 32 and the contact surface pressure of the portion B by the sub lip 43 is small, and the contact surface pressures of the portion A and the portion B become both higher than the contact surface pressure D of the flat seal portion 152 in the comparative example. Therefore, on the basis of the embodiment in accordance with the present invention, it is known that a bending deformation of the membrane-electrode assembly 10 is suppressed since the difference between the contact surface pressures of the portion A and the portion B is small, and it is possible to secure a stable sealing performance on the basis of a sufficient and stable contact surface pressure with respect to the membrane-electrode assembly 10.

What is claimed is:

1. A sealing structure for pinching a membrane-electrode assembly of a fuel cell, the sealing structure comprising:
  a first elastomeric gasket which is integrally provided in a first separator on one side in a thickness direction of the membrane-electrode assembly; and
  a second elastomeric gasket which is integrally provided in a second separator on an opposite side in the thickness direction of the membrane-electrode assembly relative to the first gasket,
  wherein said first gasket has a main lip including a top surface that directly contacts said membrane-electrode assembly when said sealing structure is pinching said membrane-electrode assembly, and the top surface is planar in a non-compressed state,
  wherein said second gasket has:
    a flat seal surface that directly contacts said membrane-electrode assembly when said sealing structure is pinching said membrane-electrode assembly, and
    a sub lip bulging relative to said flat seal surface, said sub lip being located at a position opposed to said main lip,
  wherein the top surface of said main lip has a narrower width than said flat seal surface, and
  wherein said sub lip has a narrower width than the top surface of said main lip.

2. The sealing structure as claimed in claim 1, wherein second sub lips are respectively provided at both ends in a width direction of the top portion of the main lip.

* * * * *